April 3, 1945.  J. WEIR  2,372,993
INTERNAL-COMBUSTION ENGINE PISTON
Filed Jan. 14, 1944
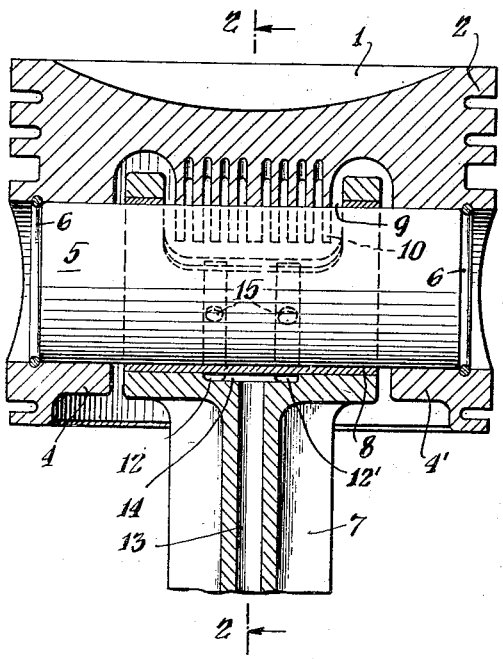
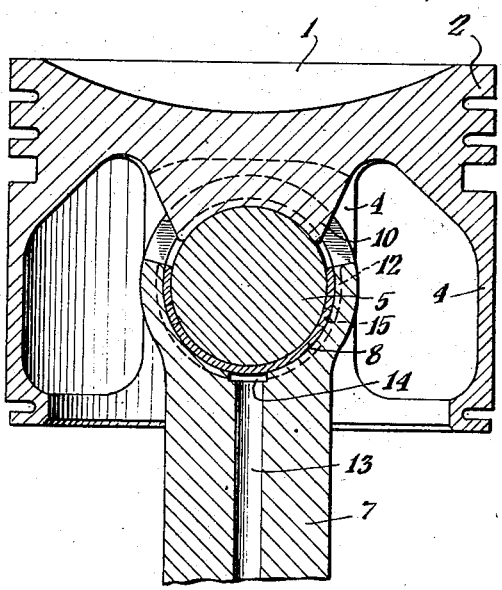
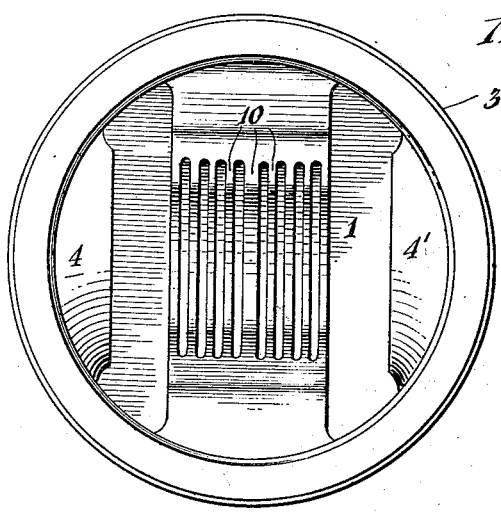
INVENTOR.
James Weir
BY
Edward B. Foote
ATTORNEY Patented Apr. 3, 1945

2,372,993

UNITED STATES PATENT OFFICE 2,372,993

INTERNAL COMBUSTION ENGINE PISTON

James Weir, University Heights, Ohio, assignor to Aluminum Company of America, Pittsburgh, Pa., a corporation of Pennsylvania Application January 14, 1944, Serial No. 518,219

4 Claims. (Cl. 123—176)

This invention relates to pistons for internal combustion engines, and relates particularly to a piston embodying an arrangement for dissipating heat from the piston head.

It is an object of this invention to provide a piston having improved means for extracting heat from the piston head. It is a further object of this invention to provide an internal combustion engine piston adapted for improved removal of heat from the piston head through the wrist pin of the piston. It is a further object of this invention to provide a piston, wrist pin, and connecting rod assembly whereby heat is transmitted from the head to the wrist pin intermediate the wrist pin bosses of the piston by means depending from the piston head and contacting the wrist pin, and means are provided for conducting a lubricant over the portion of the wrist pin contacted by the aforesaid heat transmitting means.

The accompanying drawing shows a piston, wrist pin, and connecting rod assembly embodying the invention. Referring to the drawing, Fig. 1 is a vertical sectional view of the piston and connecting rod;

Fig. 2 is a vertical longitudinal section of the assembly, taken on the line II—II of Fig. 1; and Fig. 3 is a bottom plan view of the piston shown in Figs. 1 and 2.

Referring to the drawing, the piston comprises a head or end wall 1 having a piston ring flange 2 depending therefrom with the usual piston ring grooves therein, and a skirt 3 integral with the ring flange and carrying a pair of wrist pin bosses 4 and 4' integral therewith. A wrist pin 5 is journalled in the wrist pin bosses and maintained in place by lock rings 6, and a connecting rod 7 (shown partly broken away) is journalled on the wrist pin intermediate the wrist pin bosses, there being a bearing 8 provided between the wrist pin and the head of the connecting rod.

An aperture 9 extends through the head of the connecting rod 7 adjacent the underside of the piston head 1, and also extends through the wall of the bearing 8. The underside of the piston head 1 is provided with a plurality of depending fins 10 integral therewith which extend through the aperture 9 and contact the wrist pin 5. The lower ends of the fins 10 conform in contour to the curve of the wrist pin to permit the fins to contact a sizable portion of the circumference of the wrist pin, the aperture 9 being sufficiently wide to accommodate the fins during oscillation of the head of the connecting rod on the wrist pin. Opening into the area defined by the walls of the aperture 9, at a point above the axis of the wrist pin, are a pair of chambers 12 and 12' formed by the bearing 8 and grooves in the connecting rod head, and communicating with an axial passage 13 in the connecting rod through a cross passage 14 which is likewise defined by the bearing 8 and a groove in the head of the connecting rod. The opposite end (not shown) of the connecting rod is journalled on the crank shaft of the engine, and the passage 13 communicates with an oil passage in the crank shaft in a manner well known in the art. As a result, lubricating oil from the oil system of the engine can be pumped through the passage 13 and the chambers 12 and 12' under pressure with sufficient velocity that the oil flows over the cooling fins and exposed surface of the wrist pin, with a resulting extraction of heat from the cooling fins by the oil, as well as lubrication of the contacting surfaces of the wrist pin and fins. Preferably the bearing 8 is provided with openings 15 which register with the chambers 12 and 12' and thus permit oil from those chambers to lubricate the contacting surfaces of the wrist pin and bearing. The chambers 12 and 12' extend more than half way around the wrist pin, thereby insuring that oil therefrom will flow over the upper half of the wrist pin.

The piston is preferably made of metal having high heat conductivity, such as aluminum. It may be produced satisfactorily by casting or by forging. In either case, the fins 10 may be formed in the casting or forging operation, or by machining them into a solid boss formed on the interior of the piston head during forging or casting.

In the operation of the assembly, heat imparted to the piston head by burning of gases flows through the fins 10 to the relatively cooler wrist pin, whence it is chiefly transmitted to the piston skirt and piston rings by way of the wrist pin bosses. As a result of such extraction of heat, the temperature of the piston head is lowered. Furthermore, the oil flowing over the fins 10 from the chambers 14 and 14' not only lubricates the surface of the wrist pin which is contacted by the fins 10, but also absorbs heat from the fins. The oil then falls into the crank case and eventually is carried to the oil cooler of the engine and cooled for re-circulation through the engine's oil system.

Various modifications can be made in the assembly described above without departing from the invention as defined in the following claims.

I claim:

1. In the combination comprising a piston having a piston head, a pair of oppositely disposed wrist pin bosses, and a wrist pin journalled in said bosses, means depending from said head, and contacting said wrist pin intermediate said wrist pin bosses, for conducting heat from the said piston head to the said wrist pin.

2. In the combination comprising a piston having a piston head, a pair of oppositely disposed wrist pin bosses, and a wrist pin journalled in said bosses; a plurality of fins depending from said head and contacting said wrist pin intermediate said wrist pin bosses.

3. In the combination comprising a piston having a piston head, a pair of oppositely disposed wrist pin bosses, a wrist pin journalled in said bosses, and a connecting rod journalled on said wrist pin; heat conducting means depending from said head and extending through an aperture in said connecting rod into contact with said wrist pin intermediate said wrist pin bosses.

4. In the combination comprising a piston having a piston head, a pair of oppositely disposed wrist pin bosses, a wrist pin journalled in said bosses, and a connecting rod journalled on said wrist pin; a plurality of fins depending from said head and extending through an aperture in said connecting rod into contact with said wrist pin intermediate said wrist pin bosses.

JAMES WEIR.